March 13, 1934.  F. L. WILLRODT ET AL  1,950,910
TRACTOR GUIDE
Filed March 14, 1932   3 Sheets-Sheet 1
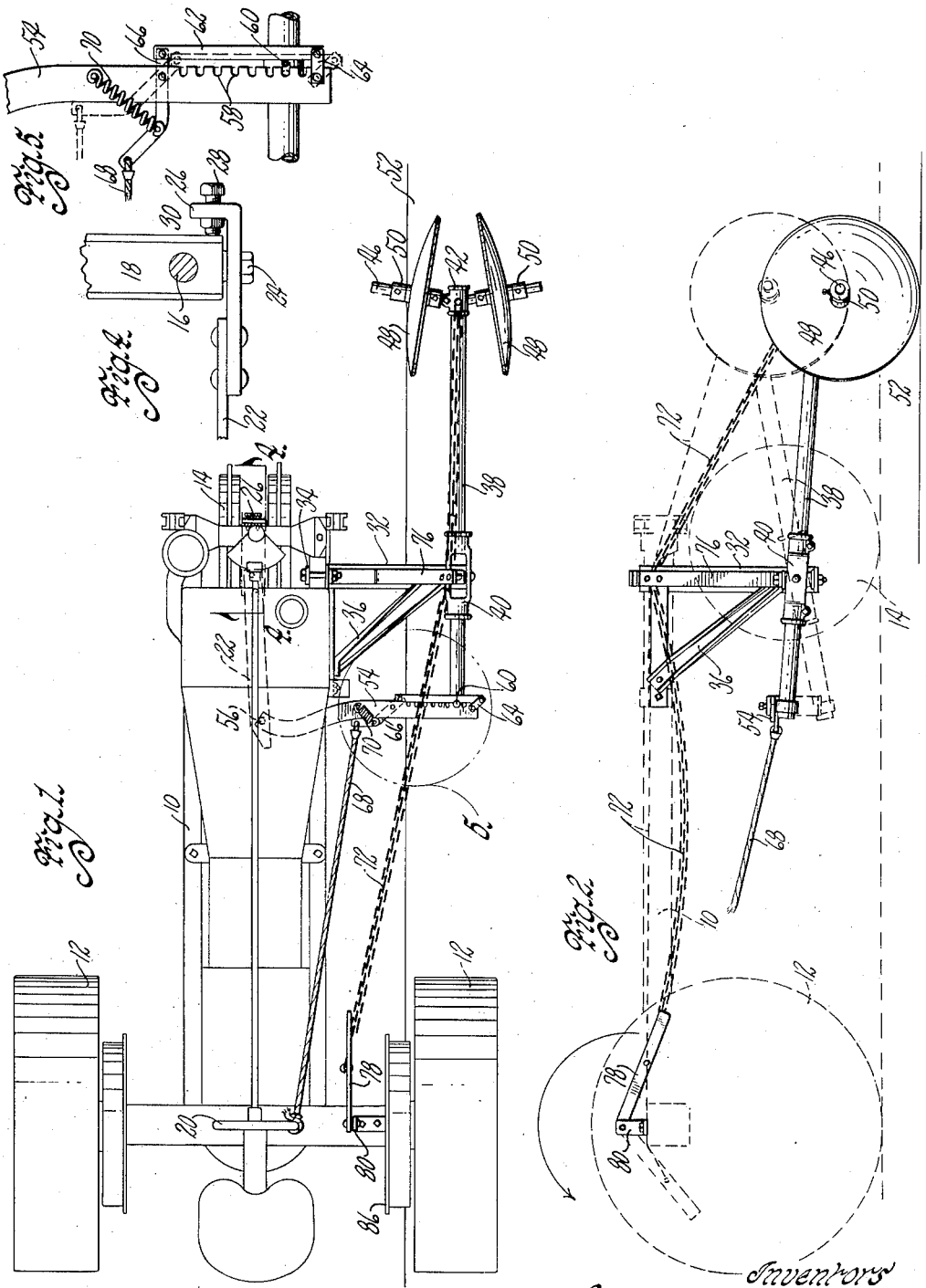

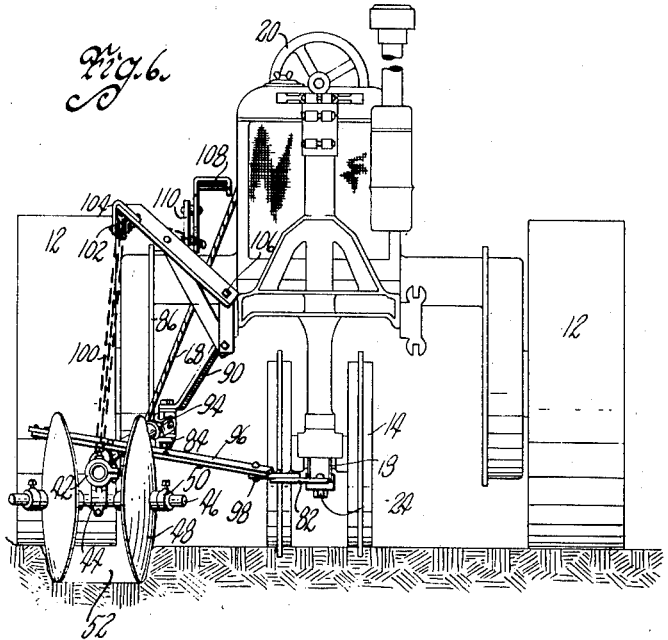
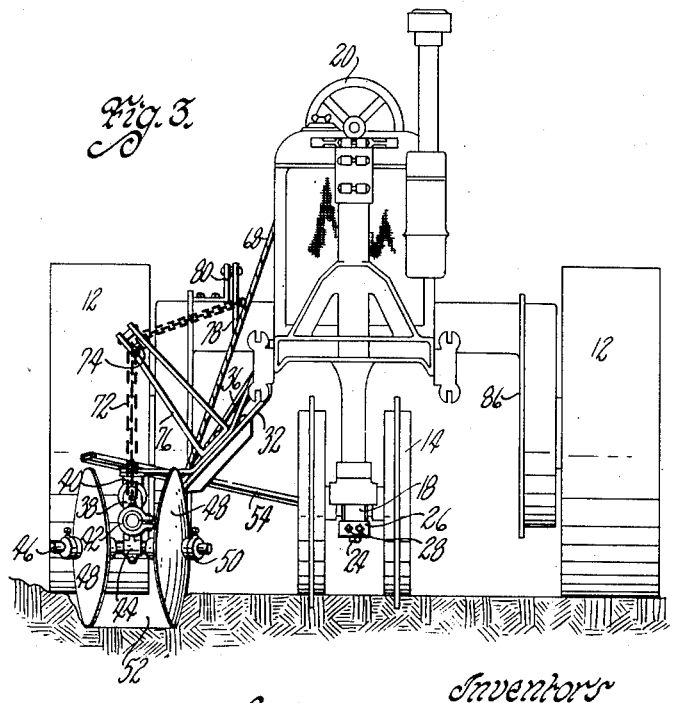

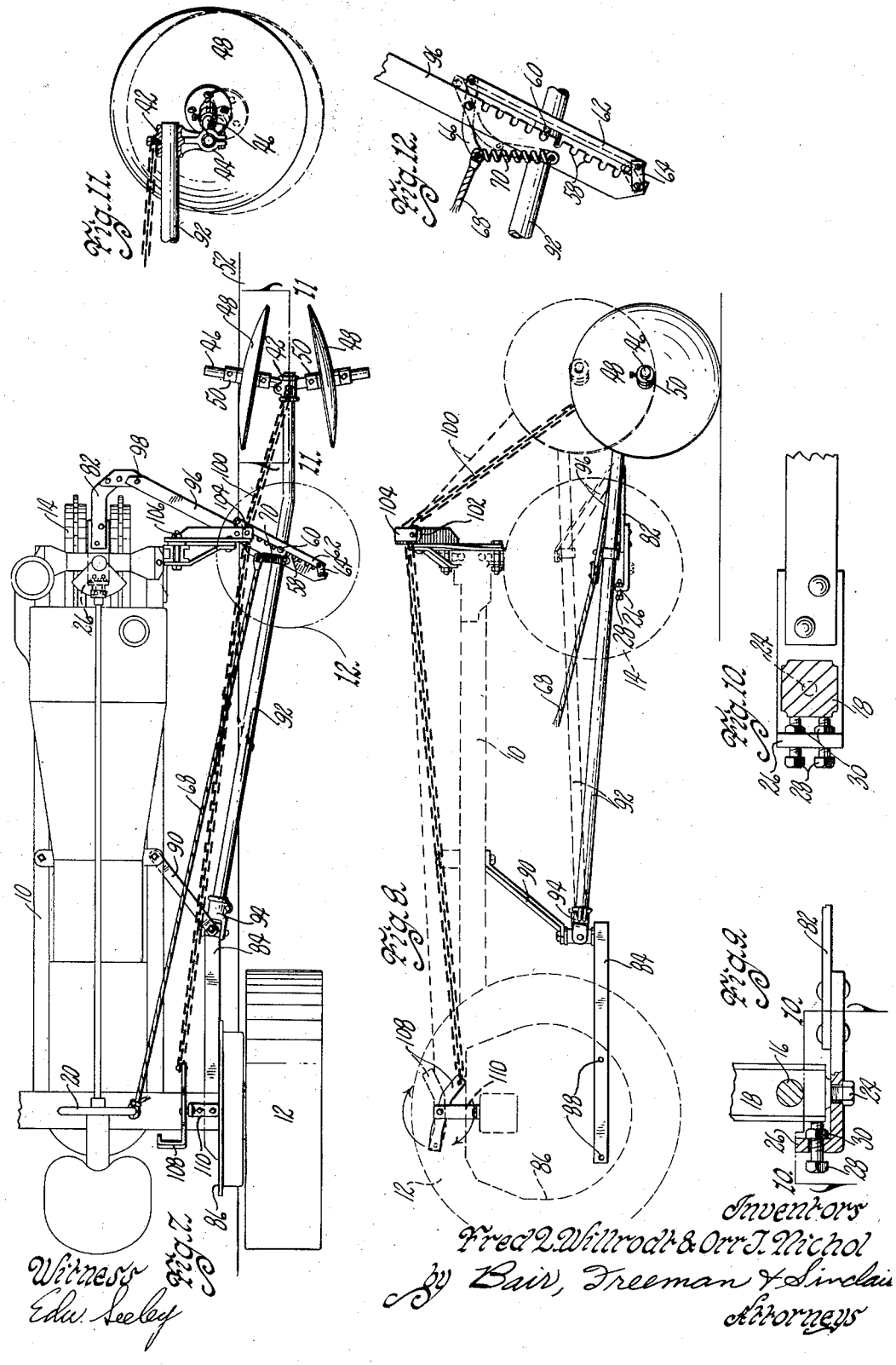

Patented Mar. 13, 1934

1,950,910

UNITED STATES PATENT OFFICE 1,950,910

TRACTOR GUIDE

Fred L. Willrodt and Orr T. Nichol, Omaha, Nebr., assignors to The Willrodt Tractor Guide Company, a corporation of Nebraska, and Nichol Manufacturing Company, a corporation of Nebraska, both of Omaha, Nebr.

Application March 14, 1932, Serial No. 598,658

5 Claims. (Cl. 97—49)

The object of this invention is to provide a tractor guide attachment having guide elements adapted to travel in a furrow to cause the tractor to be steered automatically to follow a course parallel with the furrow.

Another object of the invention is to provide an improved construction for a tractor guide designed especially for the "row crop" type of tractor, and adapted for use in the operation of plowing.

A further object of the invention is to provide an improved tractor guide having guide members carried by a guide arm which is arranged in a position substantially parallel with and spaced at one side of the line of travel of the tractor, and having a pivotal connection with a part of the tractor, whereby the guide arm and guide members are advanced by a direct pushing action in the forward movement of the tractor.

Still another object of the invention is to provide a tractor guide with improved means for connecting the guide arm pivotally to a part of the tractor, and further provided with adjustable connections through a control bar with a steering arm rigidly mounted on a part of the steering mechanism of the tractor.

A further object of the invention is to provide a plowing guide for tractors which is exceedingly simple and economical to manufacture as well as easy to install.

With these and other objects in view our invention consists in the construction, arrangement and combination of the various parts of our device, whereby the objects contemplated are attained, as hereinafter more fully set forth, pointed out in our claims, and illustrated in the accompanying drawings, in which:—

Figure 1 is a plan view illustrating a row crop type of tractor with one form of our improved plowing guide attached thereto in position for use, this form of the guide involving a steering arm extending rearwardly from the front axle of the tractor.

Figure 2 is a side elevation illustrating the same form of guide, portions of the tractor being shown in dotted lines and the guide elements being shown in dotted lines to illustrate inoperative position.

Figure 3 is a front elevation showing the same form of guide in position for operation.

Figure 4 is a detail section on the line 4—4 of Figure 1, showing particularly the means for attaching the steering arm to a part of the steering mechanism of a tractor.

Figure 5 is an enlarged plan view of the adjustable connections between the guide arm and the notched control bar, which is connected to the steering arm.

Figure 6 is a front elevation illustrating a different form of the invention in position for use on a tractor, this form of the guide including a steering arm extending forwardly from the front axle.

Figure 7 is a plan view of the same.

Figure 8 is a side elevation of the same form of the guide, portions of the tractor being shown in dotted lines and the guide elements being shown by dotted lines in inoperative position.

Figure 9 is a detail section illustrating the means for connecting the steering arm to a part of the steering mechanism.

Figure 10 is a horizontal sectional view on the line 10—10 of Figure 9.

Figure 11 is a vertical section on the line 11—11 of Figure 7, showing the means for mounting the guide discs.

Figure 12 is an enlarged plan view of the adjustable connections between the guide arm and the notched control bar which is pivotally connected to the steering arm of this form of the device.

This guide is especially designed for use on a Farmall tractor or other tractor of the row crop type having a frame 10 supported at the rear end by a pair of spaced wheels 12 and at the front end by a centrally arranged truck 14 which may include either a single wheel or a pair of wheels arranged close together near the center line of the tractor as here shown. The front truck is arranged to swing on a vertical axis for steering the tractor and as here shown it includes a front axle 16 and a vertically disposed steering post 18 having suitable connections with the steering wheel 20, which is located immediately in front of the driver's seat.

In the form of the device shown in Figures 1 to 5 inclusive, there is provided a steering arm 22 which is arranged in horizontal position at the center line of the tractor and extends rearwardly from the front axle 16. The steering arm 22 is rigidly secured to the steering mechanism so as to turn therewith, and in this instance the rigid connection is effected by means of a cap screw 24 which extends upwardly through the forward portion of the steering arm and is seated in the lower end of the steering post 18.

At its forward end the steering arm 22 is formed with an upturned flange 26 through which a pair of bolts 28 are mounted. The ends of the bolts engage the forward side of the steering post 18 and these bolts are provided with nuts 30 arranged between the steering post and the flange 26. The nuts 30 are arranged close to the upper face of the steering arm 22 and are thus prevented from turning. When the bolts 28 are tightened against the forward face of the steering post they serve to hold the steering arm 22 rigidly in position and to prevent swinging movement thereof on the cap screw 24.

A suitable supporting bracket is rigidly attached to and projects laterally from the forward portion of the tractor frame. In this instance the bracket is composed of an arm 32 which is provided at one end with a clamping device 34 engaging the frame 10 of the tractor immediately in front of the radiator. The arm 32 extends laterally and downwardly and its outer end is connected to a brace member 36 which is also rigidly attached at one end to the tractor frame.

A guide arm 38 is arranged in substantially horizontal position and substantially parallel with the center line of the tractor in position in front of one of the rear wheels 12. The guide arm 38 may be composed of tubular members having a universal joint 40 interposed therein and located between the ends of the guide arm and somewhat nearer to its rear than to its forward end. The universal joint 40 has a pivotal connection with the outer end of the supporting arm 32 to permit the guide arm 38 to oscillate on a vertical axis and also on a transverse horizontal axis.

The forward end of the guide arm 38 projects forwardly of the tractor and is provided with a clamping sleeve 42 which in turn carries a downwardly projecting hub member 44. In the hub member 44 there is mounted a transversely arranged guide axle 46 on which are rotatably mounted a pair of furrow discs 48. The guide discs or furrow discs 48 preferably are arranged for adjustment longitudinally of the axle 46, whereby the degree of spacing from the hub member 44 may be varied, and each disc is held in adjusted position and permitted to rotate between a pair of set collars 50. The guide axle 46 is bowed or bent somewhat at its center so that its respective end portions are arranged to extend forwardly from the central part which is clamped rigidly in the hub member 44. This arrangement provides for a declination of the guide discs 48 toward each other at their forward edges, which arrangement is desirable for their proper operation in a furrow indicated at 52.

An adjusting bar or control bar 54 is arranged transversely and provides a pivotal and adjustable connection between the rear ends of the steering arm 22 and guide arm 38, said control bar being pivotally connected at 56 to the rear end portion of said steering arm.

The outer end portion of the control bar 54 overlies the rear end portion of the guide arm 38 and is formed on its forward margin with a plurality of forwardly opening notches 58 which are adapted to engage selectively with an upwardly projecting pin 60 carried by the guide arm.

A retaining bar 62 is arranged parallel with and in front of the notched portion of the control bar 54, and said members are pivotally connected at their outer ends by a short link 64. To the inner end of the retaining bar 62 is pivotally connected a lever 66 which is also pivoted to the control bar 54, this portion of the lever being parallel with the link 64 and its pivots being uniformly spaced with relation to the pivots of said link.

The lever 66 extends rearwardly across the control bar 54 and its rear end portion is bent laterally toward the median line of the tractor and has a rope or cable 68 attached thereto, the rope or cable extending rearwardly to a position adjacent the operator's seat. A retractile coil spring 70 is fixed at one end to the bent portion of the lever 66 and at its other end to the inner portion of the control bar 54, its function being to move the lever to such position that the retaining bar 62 will be held in contact with the forward edge of the notched control bar, as illustrated in Figure 1 and by the dotted lines in Figure 5. When in such position the retaining bar 62 serves to hold a selected notch 58 of the control bar in engagement with the pin 60.

When it is desired to change the adjustable connection between the control bar 54 and the guide device, the lever 66 is oscillated by a rearward pull on the rope or cable 68, thus moving the retaining bar 62 to the full line position of Figure 5, wherein it is spaced slightly from the forward edge of the control bar. Then the operator turns the steering wheel 20 in one direction or another to cause an oscillation of the steering mechanism of the tractor and with it the steering arm 22 and the control bar 54, which will thus move laterally in one direction or another across the rear end of the guide arm 38. When the desired amount of adjustment has been attained, the draft on the rope or cable 68 is released, thus permitting the spring 70 to move the retaining bar 62 back to its normal position for confining the pin 60 in another of the notches 58.

This adjustment between the control bar 54 and the guide devices is provided for the purpose of compensating for sidewise slope of the ground over which the tractor may be traveling. When the ground is level and there is no appreciable side slope, the pin 60 will generally be disposed at about the center of the notched portion of the control bar 54. When the ground slopes in one direction or another, there is a tendency for the wheels of the tractor to travel downhill and this tendency is overcome by shifting the control bar 54 in one direction relative to the guide arm 38 so that the front wheels 14 of the tractor are not arranged exactly parallel with the guide devices, thus compensating for the tendency toward side slip and causing the tractor to travel in a direction parallel to the guide devices.

It is desirable to provide means for raising the guide discs 48 out of contact with the ground, especially when traveling to and from the field or when turning about at the end of a furrow. For this purpose a draft device such as a chain 72 is attached at one end to the forward end of the guide arm 38 or to the sleeve 42 carried thereby. The chain 72 extends rearwardly and also upwardly and passes over a pulley or guide 74, which preferably is located substantially above the universal joint 40 and is carried by an arm 76 mounted on the supporting bracket 32.

The chain 72 extends rearwardly from the guide 74 and is attached at its rear end to the central portion of a hand lever 78 which is fulcrumed at one end on a bracket 80 mounted on the tractor adjacent the driver's seat.

The hand lever 78 normally, during operation of the guide devices, extends forwardly from its pivotal support as indicated in Figure 1 and by solid lines in Figure 2. When it is desired to lift the discs 48 out of contact with the ground, the free end of the lever 78 is moved through an arc in the direction of the arrow in Figure 2 and the lever assumes the position indicated by dotted lines in that view. This movement of the lever causes a rearward draft on the chain 72 and a lifting of the forward end of the guide arm 38 and guide discs as indicated. It will be observed that the movement of the lever 78 just described causes the point of attachment of the chain 72 to pass rearwardly of and below the fulcrum point of the lever on the bracket 80 so that the devices tend to remain in this position until the lever is manually moved to the forward position for lowering the guide devices.

In Figures 6 to 12 inclusive there is illustrated a slightly different form of the device as applied to the same kind of a tractor upon which corresponding parts are designated by the same numerals as before.

In this form of the invention the steering arm is designated by the numeral 82 and it is fixed in a similar manner to that previously described to the steering mechanism of the tractor but extends forwardly from the front axle 16. The steering arm preferably is bent or curved laterally at its forward end in a direction toward the guide devices in order to facilitate its connection to a part which is located rearwardly of the forward edges of the wheels of the front truck 14.

The rigid support on the tractor for the steering devices is in this instance in the form of a supporting bar 84 which is bolted rigidly to the inner face of a gear housing 86 which is present in this form of tractor and which is located one at the inner side of each of the rear wheels 12. Each of the gear housings 86 is provided on its inner face with a plurality of bolts or cap screws, and two of these securing members, designated by the numeral 88, may be employed for attaching the supporting bar 84. At its forward end the supporting bar 84 is connected with a brace 90 which extends inwardly and forwardly and is rigidly secured to a suitable place on the frame 10 of the tractor.

The guide arm is in this instance designated by the numeral 92 and it is located in a position substantially parallel with the center line of the tractor and yet inclined outwardly somewhat toward its forward end so that the guide elements which it carries may be located in front of one of the rear wheels 12. The rear end of the guide arm 92 is connected to a universal joint 94 which is supported by the forward end of the supporting arm 84 and by the brace 90. On account of the slightly inclined arrangement of the guide arm 92, its forward end preferably is bent somewhat so that it lies in a vertical plane parallel with the line of draft of the tractor as shown in Figure 7.

The guide arm 92 carries at its forward end guide elements which may be identical with those previously described, these elements being mounted and arranged in a similar manner and designated by the same reference numerals previously employed.

An adjusting or control bar 96 is provided which is pivotally connected at 98 to the laterally directed forward end portion of the steering arm 82. The control bar 96 extends laterally and somewhat rearwardly and is adjustably connected to a pin 60 on the guide arm 92 by an arrangement similar to that previously described and for which the same reference numerals have been employed.

It will be noted that the positions of the lever 66 and spring 70 as illustrated in Figure 12 are reversed relative to their positions as shown in Figure 5, but the function and action is exactly the same.

For this form of the device there is also provided a lifting means for the guide elements including a chain or the like 100 attached to the forward end of the guide arm. The chain extends upwardly and over a pulley 102 which is supported by a bracket 104 attached to the forward end portion of the tractor frame by a clamping mechanism 106. The bracket 104 extends laterally and upwardly to a position substantially above the forward portion of the guide arm.

The rear end of the chain is in this instance attached to the lower end of a foot lever 108 which is fulcrumed between its ends on a bracket 110 mounted in a suitable place on the tractor. That end of the foot lever 108 to which the chain is attached normally extends forwardly from the fulcrum point of the lever and the guide elements are permitted to rest on the ground. When it is desired to raise the guides out of contact, foot pressure in a forward direction on the rear end portion of the lever is used for swinging the lever in the direction of the arrows in Figure 8, thereby applying rearward draft on the chain 100 and causing the discs 48 to be lifted clear of the ground, as indicated by dotted lines in Figure 8. It will be noted that this movement of the foot lever 108 causes the end of the chain to pass beyond and above the fulcrum point of the lever so that the parts tend to remain in the position in which they have been placed for holding the discs in elevated position.

In both forms of the device the guide arm is arranged in a position substantially parallel with and spaced at one side of the center line of the tractor and carries at its forward end the rotating guide discs which travel in the furrow ahead of one of the rear wheels of the tractor and in both forms of the device the guide arm is pivoted to a part rigidly mounted on the tractor, and is capable of swinging movement on a vertical axis and also on a transverse horizontal axis. The latter pivotal connection permits the guide device to be raised to inoperative position and to be held in such position by a lever to which a draft member is attached and which is capable of being so positioned that the point of attachment may pass beyond the fulcrum point of the lever for maintaining the guide devices in elevated position.

The pivoting of the guide arm on a vertical axis permits it to swing laterally in either direction as the guide discs travel in a furrow, and thereby the tractor is steered through a connection between the guide arm and a steering arm rigidly attached to the steering mechanism. The connection between the guide arm and the steering arm is adjustable through the use of a pin and a notched control bar, whereby adjustments may be made to compensate for side slope of the land.

It will be noted that in both forms there is a direct pivotal connection between the guide devices and a part rigidly mounted on a tractor, and that as the tractor moves forwardly there is a pushing action from this rigid part to the guide arm so that the furrow discs are pushed ahead of one of the rear tractor wheels. This, to a large measure, overcomes any tendency toward side draft on the guide discs during operation.

If desired, the guide axle 46 may be rotatably adjusted in the clamping hub member 44 as illustrated in Figure 11. This rotary adjustment, on account of the bent or bowed construction of the axle, is effective to raise or lower the discs with respect to the front end of the guide arm 38 or 92.

It will be noted that the parts of this device are very simple, making it inexpensive to manufacture and easy to install. Moreover, the guide device is very effective for steering the tractor during the operation of plowing, thereby permitting the operator to devote his attention to the plowing operation.

We have also provided a simple and easy means for attaching the steering arm rigidly to the steering mechanism so that it may project rearwardly from the axle at the center line of the tractor as in the case of the steering arm 82.

The installation of the steering arm is made easy on account of the fact that a tapped hole in which the cap screw 24 may be mounted is usually provided by the manufacturer of this type of tractor.

In the drawings we have shown and in the specification have described two different methods of mounting the guide on a tractor, but it is to be understood that many different forms of connection may be employed to suit the device to the particular form or construction of tractor with which it is to be used.

Considerable advantage is to be found in the fact that the guide elements which move in the furrow are carried at the front end of a guide arm which is arranged parallel with the line of travel and spaced at one side of the center line of the tractor. The guide arm is pivotally connected to a bracket or supporting arm rigidly mounted on the tractor through which the pushing action is applied to the guide arm and the guide elements are caused to move ahead substantially in front of one of the rear wheels of the tractor and spaced only a slight distance in advance of the tractor.

This arrangement is extremely effective in overcoming the tendency toward side thrust on the steering mechanism of the tractor which is so apt to be present in tractor guide devices because of friction on the discs or guide elements as they travel in the furrow. In this instance such thrust on the discs or guide elements is borne by the bracket which is rigidly mounted on the tractor frame, which bracket may be located either near the front end of the frame as in one of the devices illustrated, or at the rear end as in the other.

Furthermore, the adjustable connection between the guide arm and the steering arm which is rigidly mounted on a part of the steering mechanism is a simple and effective means whereby the operator, without leaving his seat, may change the position of the parts so as to compensate for sidewise slope of the ground, and whereby the parts will be effectively held in adjusted position by means of the spring urged retaining bar.

We claim as our invention:—

1. In a tractor guide, a steering arm fixed rigidly to the steering mechanism on a line parallel with the line of travel, a bracket fixed rigidly to and projecting laterally from the tractor frame, a guide arm arranged substantially parallel with said steering arm and pivoted on said bracket, a notched control bar pivoted at one end to the steering arm, a pin on said guide arm adapted to engage in a notch of said control bar whereby the latter is adjustably connected to the guide arm, a spring pressed retaining bar arranged along the notched portion of said control bar for holding said pin in place, and a guide on the forward end of said guide arm arranged to travel in a furrow, together with means for releasing said retaining bar to permit movement of said pin to a different notch of said control bar, the last named means extending to a position adjacent the driver's seat.

2. In a tractor guide, a steering arm fixed rigidly to the steering mechanism on a line parallel with the line of travel, a bracket fixed rigidly to and projecting laterally from the tractor frame, a guide arm arranged substantially parallel with said steering arm and pivoted on said bracket, a notched control bar pivoted at one end to the steering arm and at its other end releasably connected to the rear portion of said guide arm by means of a pin on said arm engaged by a notch of said bar, a spring pressed retaining bar for normally holding said pin in place, and a guide on the forward end of said guide arm arranged to travel in a furrow, together with means whereby the connection of said control bar with the guide arm may be released, said means extending adjacent the driver's seat and being operable to release said retaining bar, so that the point of said connection may be shifted lengthwise of the control bar by manipulating the steering mechanism.

3. In a tractor guide, a steering arm rigidly fixed to a part of the steering mechanism, a support on the tractor, a guide arm having a pivotal connection to said support, a guide on said guide arm adapted to travel in a furrow, a control bar pivoted at one end to said steering arm and extending across said guide arm, a pin on said guide arm, said control bar being formed with a plurality of notches adapted to engage selectively with said pin, a retaining bar arranged parallel with the notched part of said control bar and pivotally connected thereto, a spring acting to hold said retaining bar in close contact with the notched margin of the control bar to retain the pin in one of said notches, a lever pivoted to the control bar and retaining bar, and a draft element attached to said lever and extended to a position near the driver's seat, whereby draft on said element will cause an oscillation of the lever and a separation of the retaining bar from the control bar, so that manipulation of the steering gear may cause a shifting of the control bar and an engagement of a different notch with the pin on said guide arm.

4. In a tractor guide, a guide arm having its forward portion arranged substantially parallel with the line of travel of the tractor, a clamping hub at the front end of said guide arm, an axle transversely arranged in said hub, a guide disc rotatably mounted on each end portion of said axle, said axle being bent at an angle at each side of its point of engagement in said hub and being rotatably adjustable therein, whereby said discs are inclined relative to one another and whereby said discs may be shifted together by rotary adjustment of said axle in the hub, for conjunctively changing their angle with respect to the axis of said hub.

5. In a tractor guide, a steering arm fixed rigidly to and extending forwardly from the steering mechanism, a bracket fixed rigidly to the tractor frame and extending forwardly from a point adjacent the rear axle, a guide arm having a universal pivotal connection to said bracket, a guide on said arm adapted to travel in a furrow, a control bar pivoted to the forward portion of said steering arm, said control bar extending laterally across said guide arm and formed with a plurality of notches, a pin on said arm adapted to engage selectively in said notches, yielding means for retaining said pin in the selected notch, and manually operable means for releasing said yielding retaining means to permit adjustment of said pin along the notched control bar.

FRED L. WILLRODT.
ORR T. NICHOL.